United States Patent Office 3,104,258
Patented Sept. 17, 1963

3,104,258
NOVEL SYNTHESIS OF AMINO ACIDS
Arthur F. Ferris, Princeton, N.J., assignor to FMC Corporation, a corporation of Delaware
No Drawing. Filed Sept. 25, 1958, Ser. No. 763,179
9 Claims. (Cl. 260—518)

This invention relates to a novel process for the production of alpha-alkoximino carboxylic acids from methyl ketones, and for the production of alpha-amino acids by reduction of these alpha-alkoximino carboxylic acids.

The alpha-amino acids are the fundamental building blocks of animal and vegetable proteins, and a great deal of effort has been devoted to attempts to make these acids synthetically. This invention provides a novel, improved process for the preparation of alpha-amino acids by the preparation of alpha-alkoximino carboxylic acids from methyl ketones, followed by reduction to the desired alpha-amino acid. Further this invention provides a process for the preparation of a large variety of alpha-amino acids from these readily available and inexpensive methyl ketones. Thus, from acetone there is obtained an alkoximinoacetic acid from which glycine may be prepared by reduction. From methyl ethyl ketone there is obtained an alpha-alkoximinopropionic acid from which alanine may be prepared by reduction. From methyl isobutyl ketone is obtained an alpha-alkoximinoisovaleric acid which can be converted into valine. From 2-heptanone is obtained an alpha-alkoximinocaproic acid convertible into norleucine. From levulinic acid is obtained an alkoximinosuccinic acid convertible into aspartic acid. From 1-phenyl-3-butanone there is obtained an alpha-alkoximino beta-phenylpropionic acid convertible into phenylalanine. The preparation of many other useful amino acids, and derivatives thereof, will be apparent from consideration of the novel process herein.

The alpha-alkoximino carboxylic acids which are also obtained by means of this novel process are of value not only as intermediates in the amino acid synthesis, but also in the manufacture of plastics, fibers, plasticizers, pharmaceuticals, synthetic lubricants, and the like. Alpha-alkoximino acids heretofore have been prepared by alkylation of the corresponding alphaoximino acids. However, due to the high cost of preparing the alpha-oximino acids, the alpha-alkoximino acids have never developed commercially. By the process of the present invention, a variety of useful alpha-alkoximino carboxylic acids may be easily and economically obtained from methyl ketones.

The overall process for the preparation of alpha-amino and alpha-alkoximino acids may be illustrated as follows:

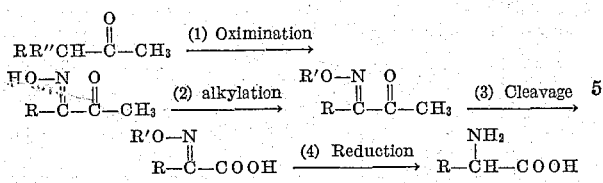

In the above formulae the nature of the R and R' groups is not critical. R'' may be hydrogen, carboxy or any other group which is replaced in the oximination reaction. R may be hydrogen, and R and R' each may be an alkyl, aralkyl or aryl radical, including bifunctional radicals, or substituted derivatives thereof, including substituents such as hydroxy, carboxy, carbalkoxy, halogen, ether, phenyl and substituted phenyl, or any other groups which are either stable to the reactants or so selected as to react in the synthesis to produce a desired product.

The first step in the process is the oximination of a methyl ketone subject to alpha-oximination, to produce an alpha-oximino methyl ketone. Methyl ketones subject to alpha-oximination include dimethyl ketone, and methylene methyl ketones including those wherein the methylene group is substituted with groups which are replaced in the oximination reaction. Oximination is conveniently carried out by treating the methyl ketone with a nitrosating agent. Common nitrosating agents include nitrous acid, nitrosyl chloride, nitrosylsulfuric acid, nitrous fumes and esters of nitrous acid, the last two reagents usually requiring acid or base catalysis. Another source of alpha-oximino methyl ketones is the oximination of such compounds as monoalkylated acetoacetic acids. This and other procedures for the preparation of alpha-oximino methyl ketones are discussed in detail by O. Touster, "Organic Reaction," vol. VII, John Wiley & Sons, New York, 1953, pp. 330–336 and 349–355.

The second step of the process is the O-alkylation of the alpha-oximino methylketone to form an alpha-alkoximino methyl ketone. This step may be carried out as an independent reaction, or combined with the oximination step. The alkylation may be done by standard procedures. For example, the alpha-oximino ketone may be dissolved in aqueous alkali, or the crude solution resulting from the oximination reaction may be extracted with aqueous alkali, to form a salt of the oxime, which reacts readily with alkylating agents such as alkyl halides or sulfates, alkylene dihalides, or other alkylating agents which may be selected to produce particular alpha-alkoximino acids. Aralkyl halides, and reactive aryl halides such as picryl chloride, may also be reacted with the oxime if such products are desired.

If an excess of alpha-oximino ketone is reacted with a difunctional alkylating agent the result is to join two molecules of the alpha-oximino ketone, thus enabling the production of dibasic alpha-alkoximino acids. If the alkylating agent is substituted with a group such as hydroxy, carboxy or carbalkoxy, products such as hydroxy acids or dibasic acids may be obtained from the cleavage reaction. Other substituents may be present on the alkylating group, such as halogen or alkoxy or other groups which are stable to the action of hypohalite or the basic conditions of the subsequent step.

The next step in the reaction sequence is the cleavage reaction. This is accomplished by reacting the alpha-alkoximino methyl ketone with alkali hypohalite, as follows:

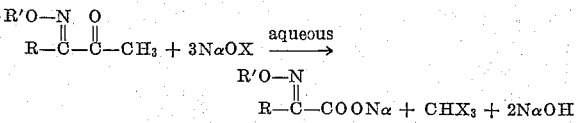

The reaction of methyl ketones with hypohalite is known as the haloform reaction. That an alpha-alkoximino methyl ketone should undergo the haloform reaction was quite unexpected, since unalkylated alpha-oximino methyl ketones when subjected to this reaction produce nitriles, which are usually hydrolyzed to carboxylic acids under the strongly alkaline conditions, as illustrated below:

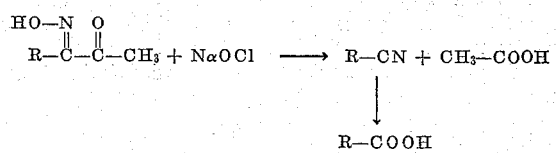

Further, the normal reaction of simple oximes with hypohalite is an addition reaction (known as the Piloty reaction), to produce halonitroso compounds, as follows:

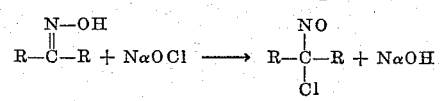

It thus appears that, in the instant invention, O-alkylation of the oxime not only protects the oxime group from the normal addition of halogen, but also prevents degradation of the molecule as occurs when the oxime is unalkylated. As a result, the methyl ketone adjacent to the alkoximino group undergoes the haloform reaction and is converted to a carboxylic group, producing an alpha-alkoximino carboxylic acid. This is a new and unexpected result, and provides a convenient and economical means for producing these useful compounds in good yields, with a wide variety of possible O-substituents.

The hypohalite reagent may be a hypochlorite, hypobromite or hypoiodite salt of a variety of metals, of which the alkali metals and alkaline earths are preferred. For reasons of economy, sodium hypochlorite is preferred. The preformed salt may be used directly, dissolved in water in any convenient concentration. Or the hypohalite may be formed in situ by adding halogen, or a halogen-releasing compound such as trichlorocyanuric acid, to aqueous alkali, either in equimolar amounts or with an excess of base. The alpha-alkoximino ketone may then either be added to the hypohalite solution, or to the aqueous base followed by addition of halogen. Since three moles of hypohalite is needed to react with one mole of methyl ketone, this ratio of components may be used, or an excess of base may be present. The reaction may be run in aqueous solution or suspension, or a cosolvent to improve the miscibility of the organic and aqueous phases may be used. For example, the use of dioxane as a cosolvent often results in improved yields.

The reaction between alpha-alkoximino ketones and hypohalite is exothermic. In general, the reaction mixture is heated to initiate the reaction, and then permitted to proceed spontaneously. External cooling may be required to control the reaction, maintaining the temperature at the range in which the reaction is self-sustaining. Many obvious variations in this procedure are possible, such as controlling the temperature by the rate of addition of a reactant, varying the concentration of the reactants, and the like.

After the cleavage reaction is completed, and the mixture cooled, excess hypohalite if any is destroyed with a reducing agent such as bisulfite, and the product is separated by standard procedures. For example, any unreacted starting material may be removed by steam distillation or solvent extraction, along with the haloform which is a byproduct of the reaction; the aqueous residue is then acidified, to recover the desired alpha-alkoximino acid.

When it is desired to reduce the alpha-alkoximino acids to the corresponding alpha-amino acids, this may be done either with or without a catalyst, following a variety of procedures. Precious metal catalysts which are suitable include unsupported platinum black or palladium black, platinum oxide (Adams' catalyst) and various forms of supported platinum and palladium, for example on charcoal or Alundum. Unusually good results have been obtained using a palladium on charcoal catalyst. Suitable solvents for use with the precious metal catalysts include aliphatic alcohols, acids, ethers, esters and the like. Active forms of metals of group VIII of the periodic table, such as "Raney nickel" and "Raney cobalt," are also useful. Solvents such as aliphatic alcohols are generally used, although other solvents such as anhydrides may be employed. Chemical reduction of the alpha-alkoximino acids may also be used, such as with zinc and acids.

The mode of carrying out this invention is illustrated in the following examples:

STEP 1.—OXIMINATION

Following are typical examples of the oximination step, starting with methyl ketones which were selected so that essential or naturally occurring amino acids would be the final products. Thus, R in the formula

R—CH$_2$—C(O)—CH$_3$ is shown as pentyl, benzyl and 2-propyl. As previously stated, the nature of the R group is not critical, and R may be hydrogen or any organic radical. In Example I the oxime produced is isolated and purified. In Examples II and III is illustrated a process wherein the oxime is not isolated, but is alkylated directly, thus combining Steps 1 and 2 of the process.

*Example I.—Preparation of 3-Oximino-2-Heptanone*

Into 800 ml. of ether containing 207.4 g. of 2-heptanone and 23 ml. of conc. hydrochloric acid was passed methyl nitrite, generated from 82.6 g. of methanol, 165.9 g. of 95% sodium nitrite, and 160 ml. of conc. sulfuric acid diluted with 145 ml. of water. The reaction temperature rose spontaneously to 39° C. and was held there by refluxing ether. Addition of the methyl nitrite required approximately 2 hours. When all the methyl nitrite had been added, a solution of 33.6 g. of sodium bicarbonate in 400 ml. of water was added cautiously to the reaction mixture. When gas evolution had ceased, the aqueous layer was separated and backwashed with 100 ml. of ether. The combined ether solution was dried over anhydrous magnesium sulfate. Evaporation of the solvent under reduced pressure left 244.0 g. (94% yield) of crude 3-oximino-2-heptanone. Recrystallization from carbon tetrachloride produced 176.3 g. (68% yield) of pure white crystals, M.P. 59–60°.

*Analysis.*—Calc'd for C$_7$H$_{13}$O$_2$N: C, 58.72; H, 9.15; N, 9.78. Found: C, 58.85; H, 9.25; N, 9.77.

*Example II.—Preparation of O-Ethyl 2-Oximino-1-Phenyl-3-Butanone*

Into a solution of 148.2 g. of 1-phenyl-3-butanone and 12 ml. of conc. hydrochloric acid in 400 ml. of ether was passed the methyl nitrite generated by adding a solution of 33.4 ml. of conc. sulfuric acid in 60 ml. of water to a mixture of 35.2 g. of methanol, 76.4 g. of 95% sodium nitrite, and 50 ml. of water. About 4.5 hours were required for this reaction. The temperature was maintained at 33–38° by refluxing ether. When the addition of methyl nitrite was concluded, the reaction mixture was stirred for half an hour, then cooled to 17° C. A solution of 60 g. of sodium hydroxide in 250 ml. of distilled water was added over 10 minutes, the temperature being kept below 20° C. by external cooling. The mixture was stirred for an additional half hour, and then the basic oxime solution was separated from the ether layer. The basic solution was then heated to 70° C., and 185.0 g. of diethyl sulfate and a solution of 48.0 g. of sodium hydroxide in 160 ml. of water were added simultaneously over half an hour. Heat of reaction maintained the temperature at 70–75° C. At the end of this time, heat was applied and the mixture was held at 70–75° C. for another hour. The reaction mixture, which had separated into two layers, was cooled to room temperature, and the organic layer was removed. The aqueous layer was extracted with three 200-ml. portions of ether, the ether extracts were combined with the organic layer, and the whole was dried over anhydrous magnesium sulfate. Evaporation of the ether left 166.2 g. (81% yield) of crude O-ethyl 2-oximino-1-phenyl-3 - butanone. Distillation at reduced pressure produced 157.2 g. (77% yield) of pure material, B.P. 73–75° C. (0.18 mm. Hg), $n^{35}$D 1.5069.

*Analysis.*—Calc'd for C$_{12}$H$_{15}$O$_2$N: C, 70.22; H, 7.37; N, 6.83. Found: C, 70.42; H, 7.48; N, 6.95.

*Example III.—Preparation of O-Ethyl 4-Methyl-3-Oximino-2-Pentanone*

The combined oximination-alkylation reaction was carried out on methyl isobutyl ketone (4-methyl-2-pentanone), as described in Example II, using 100.2 g. of 4-methyl-2-pentanone. There was obtained 93.3 g. of crude O-ethyl 4-methyl-3-oximino-2-pentanone, from which on distillation was obtained 80.4 g. (51% yield) of pure material, B.P. 60–61.5° C. (15 mm. Hg), $n^{35}$D 1.4267.

*Analysis.*—Calc'd for $C_8H_{15}O_2N$: C, 61.12; H, 9.62; N, 8.91. Found: C, 61.30; H, 9.48; N, 8.91.

STEP 2.—ALKYLATION

The following examples illustrate O-alkylation of the α-oximino methyl ketone, using a variety of alkylating agents, including some substituted with chlorine, carboxy, hydroxy and phenyl, and also a bifunctional agent. In general, excellent yields are obtained. In some of the examples, no attempt was made to recover unreacted starting material, so that yields are not reported in all cases.

*Example IV.*—*Preparation of O-Ethyl 3-Oximino-2-Heptanone*

In a solution of 4.8 g. of sodium hydroxide in 100 ml. of water was dissolved 14.3 g. of 3-oximino-2-heptanone. To this solution were added simultaneously over 15 minutes 40 ml. of a solution containing 12.0 g. of sodium hydroxide and 46.3 g. of diethyl sulfate. The mixture was warmed to 70°, at which point an exothermic reaction set in which held the temperature at 70–75° C. for 10 minutes. The mixture was held at 70–75° C. for 50 minutes more, then cooled. An organic layer separated and was drawn off, and the aqueous layer was extracted with two 100-ml. portions of ether. The organic and ether layers were combined, washed with two 50-ml. portions of 5 N hydrochloric acid and 50 ml. of water, and dried over magnesium sulfate. Evaporation of the ether under reduced pressure left 17.0 g. (99% yield) of crude O-ethyl 3-oximino-2-heptanone. Distillation gave 14.5 g. (85% yield) of pure material, B.P. 48.5–50° C. (1.35 mm. Hg), $n^{35}D$ 1.4325.

*Analysis.*—Calc'd for $C_9H_{17}O_2N$: C, 63.12; H, 10.01; N, 8.18. Found: C, 63.38; H, 9.86; N, 8.46.

*Example V.*—*Preparation of O-Ethyl 2-Oximino-3-Butanone*

To a solution of 20.0 g. of sodium hydroxide in 40 ml. of water and 300 ml. of methanol was added 50.5 g. of biacetyl monoxime (2-oximino-3-butanone), purchased from the Eastman Kodak Company. Then 110.5 g. of ethyl bromide was added, and the mixture was allowed to stand for several days. At the end of this time the mixture was added to 750 ml. of cold water. The organic layer which separated was extracted into five 100-ml. portions of ether. The ether solution was dried over anhydrous magnesium sulfate. After removal of the drying agent, the resulting solution was distilled at atmospheric pressure up to a pot temperature of 76° C. to remove most of the solvent. Distillation at reduced pressure then gave 44.1 g. (68% yield) of O-ethyl 2-oximino-3-butanone, B.P. 42–42.5° C. (13 mm. Hg), $n^{35}D$ 1.4280.

*Analysis.*—Calc'd for $C_6H_{11}O_2N$: C, 55.92; H, 8.61; N, 10.87. Found: C, 55.45; H, 8.36; N, 10.63.

*Example VI.*—*Preparation of O-Benzyl 2-Oximino-3-Butanone*

The procedure of Example V was followed, replacing the ethyl bromide with 95.0 g. of benzyl chloride, and increasing the amount of methanol to 400 ml. After three days' standing the reaction mixture was worked up by evaporating the methanol under reduced pressure and adding 150 ml. of water. The organic layer which separated was extracted into three 100-ml. portions of ether, and the ether solution was washed with three 50-ml. portions of 10% sodium hydroxide solution. The sodium hydroxide solution was backwashed with 50 ml. of ether, and this was added to the original ether solution. The combined ether solution was dried over anhydrous magnesium sulfate. Removal of the ether and distillation of the residue under reduced pressure produced 70.7 g. of O-benzyl 2-oximino-3-butanone, B.P. 78–81° C. (0.45 mm. Hg), $n^{35}D$ 1.5160.

*Analysis.*—Calc'd for $C_{11}H_{13}O_2N$: C, 69.09; H, 6.85; N, 7.33. Found: C, 69.00; H, 7.40; N, 6.96.

*Example VII.*—*Preparation of O,O'-Ethylene Bis(3-Oximino-2-Heptanone)*

To a solution of 12.0 g. of sodium hydroxide in 15 ml. of water and 150 ml. of methanol was added 42.9 g. of 3-oximino-2-heptanone. The oxime dissolved to give an orange-brown solution. Then 18.8 g. of ethylene dibromide was added, and the solution was stoppered tightly and allowed to stand. After several days, the methanol was evaporated under reduced pressure, and 100 ml. of water was added to the pasty residue. A liquid organic layer separated, and was extracted into three 100 ml. portions of ether. The combined ether layer was washed with three 50 ml. portions of 10% sodium hydroxide solution and was dried over anhydrous magnesium sulfate. Acidification of the combined original water layer and the sodium hydroxide wash led to the recovery of 18.2 g. of 3-oximino-2-heptanone. Removal of the ether from the liquid organic product left 23.3 g. of orange liquid. Distillation under reduced pressure produced 18.2 g. of O,O'-ethylene bis(3-oximino-2-heptanone), B.P. 130–134° C. (0.5 mm. Hg), $n^{35}D$ 1.4630.

*Analysis.*—Calc'd for $C_{16}H_{29}O_4N_2$: C, 61.51; H, 9.03; N, 8.97. Found: C, 61.40; H, 9.14; N, 9.03.

*Example VIII.*—*Preparation of O-(Ethyl Glycolyl) 3-Oximino-2-Heptanone*

To a solution of 8.0 g. of sodium hydroxide in 10 ml. of water was added 100 ml. of methanol, and in the resulting solution was dissolved 28.6 g. of 3-oximino-2-heptanone. Then 50.1 g. of ethyl bromoacetate was added in one portion. The reaction mixture evolved heat rapidly, and a white precipitate formed. The mixture was cooled, and allowed to stand at room temperature for 2 hours. Then 200 ml. of water was added, dissolving the precipitate. An organic layer separated, and was extracted into three 100-ml. portions of methylene chloride. The combined methylene chloride solution was dried over anhydrous magnesium sulfate, and the methylene chloride was evaporated off under reduced pressure, to leave 50.6 g. of orange oil. This oil was distilled under reduced pressure, yielding as a major fraction 29.8 g. of product boiling at 65–69° C. at 0.20 mm. Hg, $n^{35}D$ 1.4507. The infrared spectrum of this distillate showed that it contained unreacted oxime. The distillate was dissolved in 150 ml. of ether, and the ether solution was washed with three 50-ml. portions of 10% sodium hydroxide solution and 25 ml. of water. The aqueous layers were combined and back-washed with 50 ml. of ether, and the combined ether layers were dried over anhydrous magnesium sulfate. The aqueous solution was acidified with concentrated hydrochloric acid, and the white solid which precipitated was filtered and dried, to recover 5.9 g. of 3-oximino-2-heptanone, M.P. 60–61° C. Evaporation of the ether solution left 21.1 g. (58% yield) of O-(ethyl glycolyl) 3-oximino-2-heptanone, purified by distillation, B.P. 70–71° C. (0.25 mm. Hg), $n^{35}D$ 1.4449.

*Analysis.*—Calc'd for $C_{11}H_{19}O_4N$: C, 57.62; H, 8.35; N, 6.11. Found: C, 57.10; H, 7.92; N, 6.37.

*Example IX.*—*Preparation of O-(2-Hydroxyethyl)-3-Oximino-2-Heptanone*

To a solution of 8.0 g. of sodium hydroxide in 10 ml. of water was added 100 ml. of methanol, and 28.6 g. of 3-oximino-2-heptanone was dissolved in this solution. To the resulting orange solution was added 50.0 g. of ethylene bromohydrin, and the reaction mixture was allowed to stand for 4 days. At the end of this time, most of the methanol was removed under reduced pressure, and 100 ml. of water was added. An organic layer separated, and was extracted into two 100 ml. portions of ether. The resulting ether solution was extracted with four 50 ml. portions of 10% aqueous sodium hydroxide to remove unreacted oxime. The combined sodium hydroxide solution was extracted with two 50 ml. portions of ether, and the combined ether solution was dried over anhydrous magnesium sulfate. The combined sodium hydroxide solution was blown free of ether and was made just acid with concentrated hydrochloric acid. A solid precipitated and was recovered by suction filtration. It amounted, after drying, to 5.4 g. of unreacted 3-oximino-2-heptanone. Evaporation of the ether under reduced pressure left 28.7 g. of oil. Distillation of this oil produced 20.6 g. (68% yield) of O-(2-hydroxyethyl) 3-oximino-2-heptanone, B.P. 84–85° C. (0.60 mm. Hg), $n^{35}D$ 1.4588. Redistillation for an analytical sample yielded 16.5 g. of very pure material, B.P. 81–82° C. (0.45 mm. Hg), $n^{35}D$ 1.4590.

Analysis.—Calc'd for $C_9H_{17}O_3N$: C, 57.73; H, 9.15; N, 7.48. Found: C, 57.85; H, 8.93; N, 7.30.

*Example X.—Preparation of O-(2-Chloroethyl) 3-Oximino-2-Heptanone*

In 10 ml. of water was dissolved 8.0 g. of sodium hydroxide, and to the solution was added 150 ml. of methanol. In the resulting solution was dissolved 28.6 g. of 3-oximino-2-heptanone. To this solution was added 57.4 g. of ethylene chlorobromide, and the reaction mixture stoppered and allowed to stand for five days. At the end of this time the methanol and unreacted ethylene chlorobromide were evaporated under reduced pressure, and the residue was taken up in 50 ml. of water. An organic layer separated. The organic material was extracted into two 100 ml. portions of ether, and the ether solution was washed with two 50 ml. portions of 5 N sulfuric acid. The sulfuric acid solution was backwashed with 50 ml. of ether, the combined ether solution was dried over anhydrous magnesium sulfate and the ether was evaporated under reduced pressure to leave 35.1 g. of an orange oil. Unreacted oxime was removed by taking the material up in 150 ml. of ether and washing succesively with aqueous sodium hydroxide and with water. The combined aqueous solutions were backwashed with ether. The combined ether solution was dried over anhydrous magnesium sulfate. The ether was evaporated under reduced pressure from the organic solution, and the residue was distilled, to yield 13.4 g. of pure O-(2-chloroethyl) 3-oximino-2-heptanone, B.P. 59–60° C. (0.25 mm. Hg), $n^{35}D$ 1.4562.

Analysis.—Calc'd for $C_9H_{16}O_2NCl$: C, 52.55; H, 7.84; N, 6.81. Found: C, 52.68; H, 7.63; N, 6.46.

STEP 3.—CLEAVAGE

In the following examples is illustrated the cleavage of several of the alpha-alkoximino methyl ketones which were prepared in the previous examples, to produce alpha-alkoximino carboxylic acids. Yields are generally good, and in most cases unreacted starting material was not recovered. Sodium hypochlorite, both preformed and prepared in situ from sodium hydroxide and chlorine, is used as the cleavage reagent. As previously stated, other alkaline hypohalites may be used, sodium hypochlorite being preferred as readily available and easily handled.

*Example XI.—Preparation of O-Ethyl 2-Oximinocaproic Acid*

To 639 g. of 5.25% sodium hypochlorite solution was added 17.1 g. of O-ethyl 3-oximino-2-heptanone, prepared in Example IV, and 50 ml. of dioxane. The solution was warmed to 90° C. with stirring, and held at 90–96° C. for 20 minutes while chloroform, water, and dioxane distilled out. The resulting clear solution was cooled to room temperature and tested for excess hypochlorite with acidified potassium iodide solution. A positive test (brown color) was obtained, and the solution was treated with solid sodium bisulfite until the test was negative. The solution was then acidified with 5 N sulfuric acid. An oil separated, which was extracted with three 100 ml. portions of ether. The ether solution was dried over anhydrous magnesium sulfate, filtered, and the solvent was removed by evaporation under reduced pressure. The residue was distilled at reduced pressure to produce 13.1 g. (76% yield) of O-ethyl 2-oximinocaproic acid, B.P. 67–69° C. (0.4 mm. Hg), $n^{35}D$ 1.4487. On redistillation, B.P. 65–67° C. (0.4 mm. Hg), $n^{35}D$ 1.4510.

Analysis.—Calc'd for $C_8H_{16}O_3N$: C, 55.47; H, 8.73; N, 8.09; neut. equiv., 173.2. Found: C, 55.31; H, 8.60; N, 8.04; neut. equiv., 173.4.

*Example XII.—Preparation of O-Benzyl 2-Oximinopropionic Acid*

A solution of 120.0 g. of sodium hydroxide in 900 ml. of water was cooled to −4° C., and 85.1 g. of liquid chlorine was added, maintaining the temperature below 0° C. To this solution was added 150 ml. of dioxane and, at 20° C., 57.4 g. of O-benzyl 3-oximino-2-butanone, prepared as in Example VI. The temperature rose exothermically to 65° C., and was maintained at 60–65° C. for about 2 hours. The reaction mixture was then cooled to room temperature, tested for hypochlorite (negative), and acidified with 190 ml. of 5 N sulfuric acid. Then the acid solution was extracted with four 150 ml. portions of ether. The ether solution was dried over anhydrous magnesium sulfate, and the solvent was distilled off under reduced pressure. There remained 55.0 g. of crude solid. Recrystallization from hot petroleum solvent (B.P. 65–67° C.) produced 20.9 g. (36% yield) of colorless needles of O-benzyl 2-oximinopropionic acid, M.P. 84–85° C. Recovery of 18.1 g. of starting material from the mother liquor raised the yield, based on starting material not recovered, to 53%.

Analysis.—Calc'd for $C_{10}H_{11}O_3N$: C, 62.16; H, 5.74; N, 7.25; neut. equiv., 193.2. Found: C, 62.35; H, 5.66; N, 7.09; neut. equiv., 194.8.

*Example XIII.—Preparation of O-Ethyl 2-Oximino-3-Methylbutyric Acid*

The procedure described in Example XII was followed, except that 47.1 g. of O-ethyl 3-oximino-4-methyl-2-pentanone, prepared in Example III, was used as the starting material. The product was distilled under reduced pressure to produce 35.2 g. (74% yield) of O-ethyl 2-oximino-3-methylbutyric acid, B.P. 62–64° C. (0.9 mm. Hg), $n^{35}D$ 1.4436.

Analysis.—Calc'd for $C_7H_{13}O_3N$: C, 52.80; H, 8.23; N, 8.80; neut. equiv., 159.2. Found: C, 52.84; H, 8.12; N, 8.97; neut. equiv., 161.1.

*Example XIV.—Preparation of O-Ethyl 2-Oximino-3-Phenylpropionic Acid*

The procedure described in Example XII was followed, except that 61.6 g. of O-ethyl 2-oximino-1-phenyl-3-butanone, prepared in Example II, was used. There was obtained 59.5 g. (90% yield) of crude solid product. The material was recrystallized once from carbon tetrachloride and twice from petroleum solvent (B.P. 65–67° C.) to produce pure O-ethyl 2-oximino-3-phenylpropionic acid, M.P. 61–62° C.

Analysis.—Calc'd for $C_{11}H_{13}O_3N$: C, 63.75; H, 6.32; N, 6.76; neut. equiv., 207.2. Found: C, 64.00; H, 6.18; N, 6.88; neut. equiv., 206.8.

*Example XV.—Preparation of O-Ethyl 2-Oximinopropionic Acid*

The procedure described in Example XII was followed, except that 38.8 g. of O-ethyl 2-oximino-3-butanone, prepared in Example V, was used. The crude liquid product was distilled under reduced pressure to give 31.3 g. (80% yield) of fairly pure O-ethyl 2-oximinopropionic acid, B.P. 72–76° (2.1 mm. Hg). On cooling this material solidified to white crystals, M.P. 63–67° C. Recrystallization from carbon tetrachloride gave 18.0 g. of very pure crystalline O-ethyl 2-oximinopropionic acid, M.P. 68–70° C., and 11.8 g. of less pure oily acid.

*Analysis.*—Calc'd for $C_5H_9O_3N$: C, 45.79; H, 6.92; N, 10.68; neut. equiv., 131.1. Found: C, 45.95; H, 6.71; N, 10.71; neut. equiv., 132.8.

*Example XVI.—Preparation of O,O'-Ethylene Bis(2-Oximinocaproic Acid)*

A solution of 40.0 g. of sodium hydroxide in 300 ml. of water was cooled to −5° C. and 28.4 g. of liquid chlorine was added, keeping the temperature below 0° C. To this solution was added 250 ml. of dioxane and 15.6 g. of O,O'-ethylene bis(3-oximino-2-heptanone), prepared in Example VII. The temperature rose to 69° C. over 15 minutes, and was maintained at 70–75° C. for 90 minutes. After cooling to room temperature, a test for unreacted hypochlorite was negative. The reaction mixture was then extracted with three 200 ml. portions of ether to recover unreacted starting material. This ether solution was dried over anhydrous magnesium sulfate, solvent was evaporated, and the residual oil distilled, to recover 11.6 g. of unreacted starting material. The aqueous solution was blown free of ether and acidified with concentrated hydrochloric acid. The resulting slurry of white solid was cooled to 0° C., and the solid was recovered on a filter, washed with cold water and dried. There was recovered 3.0 g. (73% yield based on unrecovered starting material) of O,O'-ethylene bis(2-oximinocaproic acid), M.P. 103.5–105.5° C. The acid, after recrystallization from 50% aqueous alcohol, melted at 105.5–107° C.

*Analysis.*—Calc'd for $C_{14}H_{24}O_6N_2$: C, 53.15; H, 7.65; N, 8.86; neut. equiv., 158.2. Found: C, 53.22; H, 7.78; N, 8.89; neut. equiv., 159.3.

STEP 4.—REDUCTION

The production of several essential or naturally occurring amino acids is illustrated in the following examples, by reduction of the alpha-alkoximino carboxylic acids produced in Step 3. Catalytic and chemical reduction methods are illustrated. Unusually high yields of alpha-amino acids, generally over 93%, are obtained using a palladium-on-charcoal catalyst. This is considered to be a novel and improved technique for the reduction of alpha-alkoximino acids.

*Example XVII.—Preparation of 2-Amino-3-Methylbutyric Acid (Valine)*

A solution of 22.7 g. of O-ethyl 2-oximino-3-methylbutyric acid, prepared in Example XIII, in 100 ml. of absolute ethanol was placed in the reaction bottle of a Parr pressure reaction apparatus, type 3911. The bottle was flushed with nitrogen, and 5.0 g. of 5% palladium-on-charcoal catalyst was added. It was then placed in the apparatus, evacuated, pressurized with hydrogen to 50 p.s.i. and agitated until the theoretical amount of hydrogen had been taken up. About two-thirds of the hydrogen was absorbed in 12 hours at 28° C. Heat was then applied, and about 7 hours at 70° C. was required to complete the reaction. At the end of this time the reaction bottle was depressurized and withdrawn from the apparatus, and the contents were cooled to 5° C. and filtered by suction. The recovered solid (catalyst and most of the product) was boiled with 175 ml. of water until the volume was reduced to about 125 ml., and then the mixture was filtered hot. The solid was washed with three 25-ml. portions of boiling water. The combined filtrate was concentrated to 75 ml., the mixture was cooled to 0° C., and 50 ml. of ethanol was added. The solid which precipitated was recovered by filtration and dried. It amounted to 10.6 g. Concentration of the filtrate, and of the filtrate from the reduction mixture, produced another 4.6 g. of solid. The total recovery of DL-valine was 15.2 g. (91% yield). The infrared spectrum of this material was identical to that of authentic DL-valine.

*Example XVIII.—Preparation of 2-Amino-3-Phenylpropionic Acid (Phenylalanine)*

A solution of 10.4 g. of O-ethyl 2-oximino-3-phenylpropionic acid, prepared in Example XIV, in 50 ml. of absolute alcohol containing 3.0 g. of 5% palladium-on-charcoal catalyst, was prepared and pressurized to 50 p.s.i. with hydrogen as described in the previous example. The theoretical amount of hydrogen was taken up in 3 hours at 50° C. The reaction bottle was depressurized, and the contents were cooled to 0° C. and filtered. The recovered solid (catalyst and most of the product) was boiled for 10 minutes with 250 ml. of water, and the mixture was filtered hot. The solid (catalyst) was washed with three 30-ml. portions of boiling water and saved for recovery of palladium. The combined aqueous filtrate was concentrated to 175 ml. and cooled in ice to precipitate the first crop of DL-phenylalanine. After drying it amounted to 5.0 g. Further concentration gave 2.7 g. more of product, for a total recovery of DL-phenylalanine of 7.7 g. (93% yield). The infrared spectrum of this material was identical to that of an authentic specimen of DL-phenylalanine.

*Example XIX.—Preparation of 2-Aminopropionic Acid (Alanine)*

A solution of 14.5 g. of O-benzyl 2-oximinopropionic acid, prepared in Example XII, in 60 ml. of absolute ethanol containing 4.5 g. of 5% palladium-on-charcoal catalyst, was prepared and pressurized to 50 p.s.i. with hydrogen as described in Example XVII. The theoretical amount of hydrogen was taken up in 7½ hours at 25° C., another 60 ml. of ethanol having been added after 4½ hours. When hydrogen uptake was complete, the reaction bottle was depressurized, and the semi-solid contents were filtered. The solid, a mixture of catalyst and product, was boiled with 125 ml. of water until the volume was reduced to 75 ml. The mixture was then filtered hot, and the solid recovered (catalyst) was washed with two 25-ml. portions of boiling water. The combined aqueous filtrate was concentrated to 20 ml. and cooled, and 40 ml. of ethanol was added. The solid which precipitated was recovered by filtration and dried. It amounted to 2.0 g. Evaporation of the alcohol filtrate from the original reduction mixture produced 3.9 g. of solid product, for a combined yield of DL-alanine of 5.9 g. (88% yield). The infrared spectra of both solids were identical with that of authentic DL-alanine.

*Example XX.—Preparation of 2-Aminopropionic Acid (Alanine)*

A solution of 13.1 g. of O-ethyl 2-oximinopropionic acid, prepared in Example XV, in 60 ml. of methanol containing 6.0 g. of 5% palladium-on-charcoal catalyst, was prepared and pressurized with hydrogen to 50 p.s.i. as described in Example XVII. The theoretical amount of hydrogen was taken up in 5½ hours at room temperature. The reaction mixture was diluted with 50 ml. of methanol, filtered, and washed with methanol. The filter cake was boiled with 150 ml. of water until the volume was reduced to 75 ml. The resulting mixture was filtered hot, and the filter cake (catalyst) was washed with 50 ml. of boiling water. The combined filtrate was concentrated to 25 ml., and 70 ml. of ethanol was added. The resulting slurry of white solid was filtered and dried, to yield 5.7 g. of DL-alanine. Further concentration of the filtrate from the crystallization produced 0.4 g. of DL-alanine, and concentration of the methanol filtrate from the original reduction mixture yielded another 2.2 g. of DL-alanine, for a total recovery of 8.3 g. of DL-alanine (93% yield). The infrared spectrum of this material was identical to that of an authentic sample.

*Example XXI.—Preparation of 2-Aminocaproic Acid (Norleucine)*

A solution of 17.3 g. of O-ethyl 2-oximinocaproic acid, prepared in Example XI, in 300 g. of glacial acetic acid, was heated to 100° C., and 65.4 g. (1.0 mole) of zinc powder was added over 30 minutes at such a rate as to hold the temperature at 95–105°. External heat was applied, and the temperature was held at 95–105° for an hour. At the end of this time, part of the acetic acid (150 g.) was distilled off under reduced pressure and the residue was taken up in a liter of water. The suspended solid was removed by filtration, and the filtrate was treated with hydrogen sulfide gas until no further zinc sulfide precipitated. The zinc sulfide was removed by filtration, and the filtrate was concentrated to 250 ml. A precipitate began to form, and more appeared when the mixture was cooled to 2° C. and brought to pH 3.5 with about 5 ml. of 10% aqueous sodium hydroxide. The white crystals were recovered by filtration and dried, and amounted to 7.1 g. More norleucine, amounting to 1.9 g., was recovered by extracting the solids originally recovered from the reduction mixture with 150 ml. of boiling water, treating with hydrogen sulfide to precipitate zinc sulfide, removing the zinc sulfide by filtration, and concentrating. The total recovery of DL-norleucine was 9.0 g. (69% yield). The infrared spectrum of this material was identical to that of authentic DL-norleucine.

Illustrated above are the four steps which comprise this novel process for the production of alpha-amino acids from methyl ketones. Specifically illustrated are four amino acids of nutritional importance, valine, alanine, phenylalanine and norleucine. Other alpha-amino acids, made available by this process, are suitable for the manufacture of polyamide resins for molding and fiber-forming uses, as intermediates in further synthesis, and a variety of other uses.

The alpha-alkoximinoalkanoic acids, produced in Step 3, are valuable in themselves and also as intermediates in a variety of chemical syntheses. They may be used as precipitants for a number of ions, since they form alkali-insoluble complexes. Difunctional materials combining a carboxyl with some other function on the O-alkyl group are of additional utility; for example, chelating action from a dicarboxylic acid obtained by etherifying the alpha-oximino group with a carboxyalkyl radical, or plasticizing action from a long alkyl chain with a terminal chlorine atom. Many other modifications are apparent. The O,O′-alkylenebisoximinoalkanoic acids, such as the product of Example XVI, are useful, for example, in the manufacture of alkyd resins for coatings and molding compounds, for further reaction with polyisocyanates for the manufacture of polyurethane resins, as surfactants, and other uses.

The preceding description and examples are illustrative only, and many variations are possible which conform to the spirit of the invention, and are included within the scope of the following claims.

I claim:
1. The method of producing an alpha-alkoximino carboxylic acid from an alpha-alkoximino methyl ketone which comprises reacting an alpha-alkoximino methyl ketone of the formula

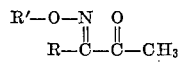

in which R′ is a member of the group consisting of alkyls, aralkyls, and these moieties substituted by a member of the group consisting of hydroxyl, halogen, and

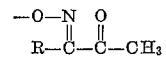

and R is a member of the group consisting of alkyls, aralkyls and aryls, with three equivalents of an alkaline hypohalite of the group consisting of alkali metal and alkaline earth metal hypohalites, while maintaining the temperature in the range at which the reaction is self-sustaining, thereby producing said alpha-alkoximino carboxylic acid.

2. The method of claim 1 wherein the alkaline hypohalite is sodium hypohalite.

3. The method of claim 1 wherein the alpha-alkoximino methyl ketone is an O,O′-alkylene bis(alpha-oximinomethyl ketone).

4. The method of claim 1 wherein the alpha-alkoximino methyl ketone is an alpha-hydroxyalkoximino methyl ketone.

5. The method of claim 1 wherein the alpha-alkoximino methyl ketone is an alpha-aralkoximino methyl ketone.

6. The method of producing 2-alkoximinocaproic acid from 3-alkoximino-2-heptanone which comprises reacting the 3-alkoximino-2-heptanone with 3 equivalents of an alkaline hypohalite of the group consisting of alkali metal and alkaline earth metal hypohalites, while maintaining the temperature in the range at which the reaction is self-sustaining, thereby producing said 2-alkoximinocarproic acid.

7. The method of producing 2-alkoximinovaleric acid from 4-methyl-3-alkoximino-2-pentanone which comprises reacting the 4-methyl-3-alkoximino-2-pentanone with 3 equivalents of an alkaline hypohalite of the group consisting of alkali metal and alkaline earth metal hypohalites, while maintaining the temperature in the range at which the reaction is self-sustaining, thereby producing said 2-alkoximinovaleric acid.

8. The method of producing 2-alkoximino-3-phenylpropionic acid from 1-phenyl-2-alkoximino-3-butanone which comprises reacting the 1-phenyl-2-alkoximino-3-butanone with 3 equivalents of an alkaline hypohalite of the group consisting of alkali metal and alkaline earth metal hypohalites, while maintaining the temperature in the range at which the reaction is self-sustaining, thereby producing said 2-alkoximino-3-phenylpropionic acid.

9. The method of producing 2-alkoximinopropionic acid from 3-alkoximino-2-butanone which comprises reacting the 3-alkoximino-2-butanone with 3 equivalents of an alkaline hypohalite of the group consisting of alkali metal and alkaline earth metal hypohalites, while maintaining the temperature in the range at which the reaction is self-sustaining, thereby producing said 2-alkoximinopropionic acid.

References Cited in the file of this patent

UNITED STATES PATENTS

| 1,930,449 | Bruson et al. | Oct. 10, 1933 |
| 2,470,083 | Hartung | May 17, 1949 |

OTHER REFERENCES

Diels et al.: Ber. Deut. Chem., vol. 38, pp. 1917–21 (1905).

Wagner et al.: Synthetic Organic Chemistry, pp. 658, 422–3, 739–40.

Touster: Organic Reactions, vol. VII, chapter 6, pp. 330–36, 348–9, 358 and 360 (1953).

Waters: "J. Org. Chem.," vol. 12, p. 469 (1947). (Copy in Library and Division 38, 260–534.)